(12) United States Patent
Starr

(10) Patent No.: US 11,059,649 B2
(45) Date of Patent: Jul. 13, 2021

(54) SELF-CONTAINED COLD BREW BEVERAGE CONTAINER

(71) Applicant: Jeffrey T. Starr, West Windsor, NJ (US)

(72) Inventor: Jeffrey T. Starr, West Windsor, NJ (US)

( * ) Notice: Subject to any disclaimer, the term of this patent is extended or adjusted under 35 U.S.C. 154(b) by 93 days.

(21) Appl. No.: 16/247,223

(22) Filed: Jan. 14, 2019

(65) Prior Publication Data

US 2019/0241347 A1    Aug. 8, 2019

Related U.S. Application Data

(60) Provisional application No. 62/625,436, filed on Feb. 2, 2018.

(51) Int. Cl.
*B65D 81/32* (2006.01)
*B65D 85/804* (2006.01)
*B65B 51/10* (2006.01)
*B65B 29/02* (2006.01)
*A47J 31/00* (2006.01)
*B65D 85/808* (2006.01)

(52) U.S. Cl.
CPC ........ *B65D 81/3272* (2013.01); *A47J 31/005* (2013.01); *B65B 29/028* (2017.08); *B65B 51/10* (2013.01); *B65D 85/808* (2013.01); *B65D 85/8043* (2013.01)

(58) Field of Classification Search
CPC ............ B65D 81/3272; B65D 85/8043; B65D 85/808; B65B 29/028; B65B 51/10; A47J 31/005
See application file for complete search history.

(56) References Cited

U.S. PATENT DOCUMENTS

| | | | | |
|---|---|---|---|---|
| 2,102,716 A | * | 12/1937 | Berch | B65D 77/06 426/127 |
| 2,899,318 A | * | 8/1959 | Long | A23P 30/40 426/112 |
| 3,293,048 A | * | 12/1966 | Kitterman | B65D 81/3272 426/113 |
| 4,540,089 A | * | 9/1985 | Maloney | B65D 31/12 206/219 |
| 5,967,308 A | | 10/1999 | Bowen | |
| 6,935,492 B1 | * | 8/2005 | Loeb | B65D 81/3272 206/219 |
| 2007/0199453 A1 | | 8/2007 | Rasmussen et al. | |

(Continued)

FOREIGN PATENT DOCUMENTS

JP    3-236751    * 10/1991 ......... B65D 81/3272

OTHER PUBLICATIONS

Observer, Would you drink cold brew from a plastic bag?, [online] May 25, 2016, retrieved Jun. 30, 2020. Retrieved from the Internet: URL:<https://observer.com/2016/05/would-you-drink-cold-brew-from-a-plastic-bag/>.*

*Primary Examiner* — Viren A Thakur
*Assistant Examiner* — Chaim A Smith
(74) *Attorney, Agent, or Firm* — Fox Rothschild LLP

(57) ABSTRACT

Provided are cold brew beverage products, methods of preparing cold brew beverages, and methods of making cold brew beverage products. In particular, cold brew beverage products are provided that include an infusion bag containing infusible material, a receptacle containing water having at least one breakable wall, and an outer container.

7 Claims, 4 Drawing Sheets

(56) References Cited

U.S. PATENT DOCUMENTS

| | | | |
|---|---|---|---|
| 2007/0224316 A1* | 9/2007 | Beukes | B65D 77/04 |
| | | | 426/115 |
| 2008/0276645 A1* | 11/2008 | Murray | B65D 81/3266 |
| | | | 62/530 |
| 2011/0308977 A1* | 12/2011 | DiLiberto | B65D 81/3272 |
| | | | 206/222 |
| 2012/0021108 A1 | 1/2012 | Baumann et al. | |
| 2013/0136833 A1* | 5/2013 | Vastardis | A23F 5/262 |
| | | | 426/416 |
| 2016/0270587 A1* | 9/2016 | Yu | A23F 3/18 |
| 2016/0316957 A1 | 11/2016 | Tran | |
| 2017/0000289 A1 | 1/2017 | Feber | |

* cited by examiner

SELF-CONTAINED COLD BREW BEVERAGE CONTAINER

CROSS-REFERENCE TO RELATED APPLICATIONS

This application claims priority to U.S. Provisional Application No. 62/625,436, filed on Feb. 2, 2018, the disclosure of which is incorporated herein by reference in its entirety.

BACKGROUND

Infused beverages, such as coffee and tea, have long been consumed. While infused hot beverages are very common, the demand for infused cold beverages, especially for cold brew coffee, has been increasing in the recent years.

Coffee has been conventionally brewed using hot or boiling water. One drawback of hot brewed coffee is that the taste can sometimes be acidic and harsh.

Coffee can also be brewed using cold water. Cold brewing provides a rich liquid coffee that can be smoother and less bitter than that produced by traditional high temperature extraction methods because the latter can leach bitter components into the coffee, and the resulting liquid coffee is of a significantly higher pH. A demand has arisen for cold brewed coffee due to the improved taste, and cold coffee brewing is a growing segment of the coffee industry.

Generally, the cold brewing process involves steeping a mixture of coffee grounds and water for about 8-24 hours and then filtering the mixture to obtain either the extract or the coffee itself based on the proportion of water. This process requires a consumer to handle coffee beans and/or coffee grounds, which is messy and undesirable. For example, in some cases, consumers are required to measure dry coffee grounds (or coffee beans) during the initial steps of the cold brew process. Then, once the cold brew process is complete, consumers are required to dispose of loose, soaked coffee grounds (or coffee beans).

Another shortcoming of existing cold brew beverage systems is that they are not portable. Brewing cold pressed coffee either requires the use of complex machines or, alternatively, involves a messy process of placing coffee grinds in a pitcher of water in the refrigerator for up to 18 hours, then pouring the mix through a filter before drinking.

SUMMARY

In certain aspects, cold brew beverage products are provided comprising an infusion bag; infusible material disposed within the infusion bag; a receptacle comprising at least one breakable wall, the receptacle containing water; and an outer container, wherein the infusion bag and the receptacle are each disposed within the container.

In certain aspects, methods are provided for cold brewing a beverage. In accordance with one aspect, the method includes providing a) an infusion bag, wherein infusible material is disposed within the infusion bag, b) a receptacle comprising at least one breakable wall, the receptacle having water stored therein, and c) an outer container, wherein the infusion bag and the receptacle are each disposed within the outer container. The method also includes exerting an external force on the outer container to rupture a wall of the receptacle, wherein an opening is formed in the receptacle to allow the water to flow into the outer container such that the water to comes in contact with the infusion bag. Additionally, the method includes incubating the outer container at a temperature and for a period of time sufficient to allow the infusible material to steep in the water to produce a beverage.

In certain aspects, methods are provided for making cold brew beverage products. According to one aspect, a method includes a) folding a piece of porous material to form a bag, the bag comprising a first sidewall of porous material, a second sidewall of porous material overlaying the first sidewall, a first side edge, an opposite second side edge, a bottom edge extending between the first and second side edges, and a top edge, b) sealing the first and second side edges to form the bag, and c) placing infusible material in the bag. The method also includes d) sealing the top edge of the bag to form an infusion bag, e) providing a first and second sheet of water-impermeable material, and f) joining the first and second sheets at the peripheries thereof to form a receptacle, the receptacle comprising a first sidewall of water-impermeable material, a second sidewall of water-impermeable material overlaying the first sidewall, a first side edge, an opposite second side edge, a bottom edge extending between the first and second side edges to provide an interior volume, and a top edge containing an opening. Additionally, the method includes g) introducing purified water into the receptacle through the opening, h) sealing the opening to form a water-tight receptacle, i) placing the infusion bag and the water receptacle between a first and a second sheet of an outer material having a higher rupture point than the material from which the water receptacle is formed, and j) joining the first and second sheets of the outer material at the peripheries thereof to form an outer container.

DETAILED DESCRIPTION

Figure 1:
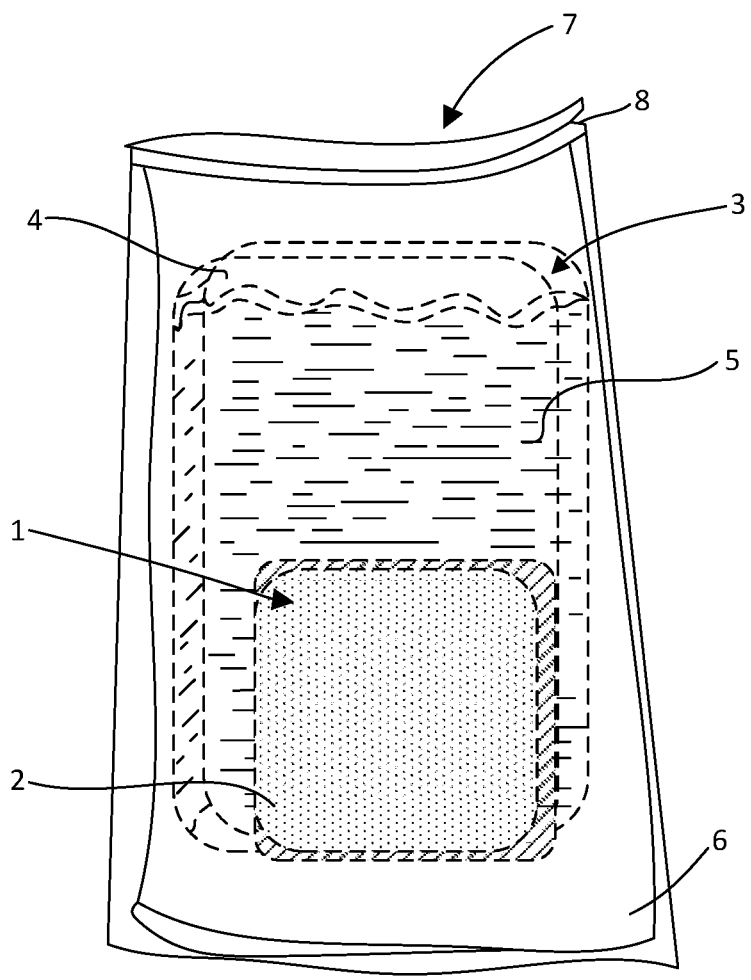
FIG. 1 illustrates a front plan view of a self-contained cold brew beverage product in accordance with an aspect of the disclosure.

For the following defined terms, these definitions shall be applied, unless a different definition is given in the claims or elsewhere in this specification. All numeric values are herein assumed to be modified by the term "about", whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

This document describes a cold brew beverage product that is easy to use and that provides a compact and convenient solution to the consumer who wishes to enjoy the benefits and taste of a cold brewed beverage. The cold brew beverage product may be readily shipped and stored. Additionally, the arrangement of the components provides a long shelf life to the product.

The following description may be read with reference to the drawings wherein like reference numerals indicate like elements throughout the several views. The drawings, which are not necessarily to scale, depict illustrative embodiments.

Figure 2:
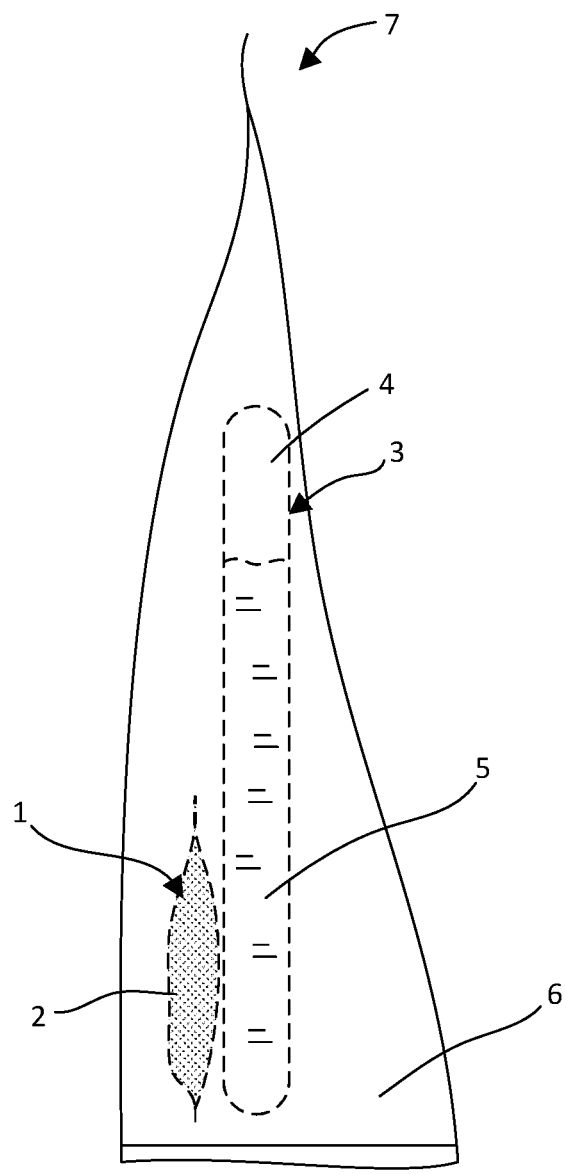
FIG. 2 illustrates a side plan view of the self-contained cold brew beverage product of FIG. 1.

FIGS. 1-2 show a cold brew beverage product 7 including: an infusion bag 1; infusible material 2 disposed within the infusion bag 1; a receptacle 3 including at least one breakable wall 4, the receptacle 3 containing water 5; and an outer container 6, wherein the infusion bag 1 and the receptacle 3 are each disposed within the outer container 6.

In some embodiments, the breakable wall 4 of the receptacle 3 is formed by a material having a rupture point lower than that of the outer container 6, wherein upon external compression of the outer container 6, the breakable wall 4 is at least partially ruptured, thereby allowing the water 5 to flow from the receptacle 3 into the outer container 6 and come into contact with the infusion bag 1.

In some embodiments, the infusion bag 1 may be comprised of any non-toxic porous material which can contain the infusible substance and withstand the temperature of the liquid used for preparing the beverage. In some embodiments, the material used to form the infusion bag 1 is any suitable material, including, but not limited to, paper, plastic or cloth. In some embodiments, the infusion bag 1 of is made of porous paper. However, it is to be understood that infusion bag 1 is not limited to the above-described materials.

In some embodiments, the infusible material 2 is comprised of any substance suitable for preparing a beverage including, but not limited to, ground coffee, tea leaves, juice extract, etc. The particular grind size of the infusible material 2 (e.g., course, medium, fine, etc.) may depend on the type of material itself, the user's preferences, etc.

In accordance with some aspects, the receptacle 3 in which water is stored is in the form of a water-tight bag. The bag may be made from one or more materials that may be broken open when the user applies force to the product. In some embodiments, the bag may be made from relatively flexible sheet material. For example, in certain embodiments, the bag is comprised of plastic. Preferably, the plastic is free of leachable chemicals such as, e.g., bisphenol-A (BPA). In some embodiments, the material is formed of a heat-sealable plastic. Additionally, in accordance with some aspects, the material has a thickness ranging from about 0.25 mil to about 1.5 mil. However, it is to be understood that the material may be thinner or thicker than the range described above. Furthermore, the material forming receptacle 3 is not limited to plastic and may be any appropriate water-tight material such as, e.g., foil. In order to accommodate for potential atmospheric pressure changes during transport (including high-altitude transport), the receptacle 3 may be flexed and/or compressed before sealing.

In one specific example, infusion bag 1 is filled with 1.7 oz. of medium grind, Extra Dark Roast coffee, while receptacle 3 is filled with 20 oz. of water. In additional and/or alternative embodiments, lower ratios of coffee-to-water may be used to maintain similar flavor and character of the final product. These ratios may be dependent upon user preferences and/or characteristics of specific coffee beans and grind levels.

In some aspects of the disclosure, the outer container 6 is configured in the form of a bag. In some embodiments, the bag may be formed of multiple sheets of flexible material such as, e.g., plastic, polyester, nylon, polypropylene, aluminum foil, polyethylene, etc. The bag may be configured to be vacuum sealable and/or heat sealable at one or more edges. In some embodiments, the flexible material forming the outer container 6 has a thickness of about 3 mil. In some embodiments, the material may be formed of a plastic that is BPA-free.

In some embodiments, the outer container 6 may include a notch 8. The notch 8 may facilitate tearing of an edge of the outer container 6 by the user. Additionally, while not shown in FIGS. 1-2, the edge of outer container 6 adjacent notch 8 may include serrations to further facilitate the tearing of the outer container 6. Additionally and/or alternatively, the edge of the outer container 6 adjacent notch 8 may include a sealing feature to allow for selective opening and closing of the outer container 6.

Figure 3:
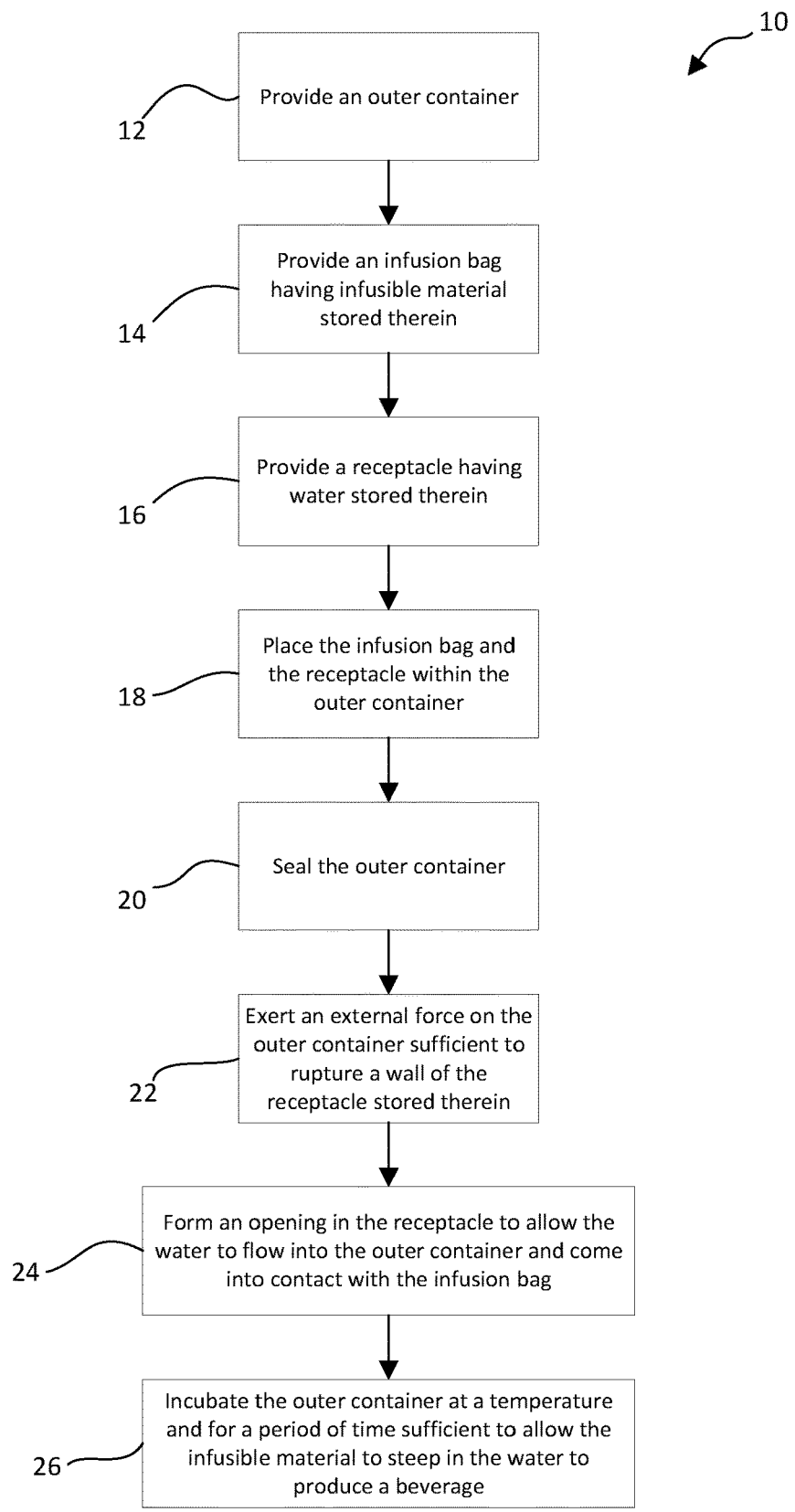
FIG. 3 is a flow chart illustrating the steps of cold brewing a beverage in accordance with an aspect of the disclosure.

Referring now to FIG. 3, in accordance with some aspects of the disclosure, a method 10 is provided for cold brewing a beverage. The method including the steps of providing an outer container (step 12), providing an infusion bag having infusible material stored therein (step 14), and providing a receptacle having water stored therein (step 16). Next, at step 18, the infusion bag and the receptacle containing water are placed within the outer container, and the outer container is then sealed (step 20). The method further includes the step of exerting sufficient external force on the outer container to rupture a wall of the receptacle disposed within the outer container (step 22), forming an opening in the receptacle to allow the water to flow into the outer container such that the water to comes in contact with the infusion bag (step 24), and incubating the outer container at a temperature and for a period of time sufficient to allow the infusible material to steep in the water to produce a beverage (step 26).

Referring again to FIGS. 1-2, to prepare a cold brew beverage, the user may apply external force to the one or more sides of outer container 6 at a level sufficient to result in the rupture of the receptacle 3 containing the water 5. While the user applies force sufficient to rupture one or more walls of receptacle 3, the force is not so great as to open or rupture outer container 6. For example, in accordance with one embodiment, the user may apply between 5 and 10 lbs. of pressure on one or more sides of outer container 6 in order to rupture receptacle 3 housed therein. Once ruptured, the water 5 flows out of the internal water receptacle 3 and remains inside of the outer container 6 such that the water 5 enters into contact with the infusion bag 1.

While receptacle 3 is described above as rupturing simply due to pressure exerted by the user thereon, it is to be understood that other methods of rupturing or otherwise emptying receptacle 3 are also possible. For example, in some embodiments, one or more inner surfaces of outer container 6 may include one or more piercing members, with the one or more piercing members capable of penetrating the receptacle 3 when the outer container 6 is manipulated or squeezed in a certain way. In accordance with other embodiments, the receptacle 3 may include one or more valves or seals which allow for the expulsion of water 5 from the valves or seals after a certain amount of pressure is applied to outer container 6 and receptacle 3.

As described above, in some embodiments, the infusion bag 1 contains coffee or another infusible material, including but not limited to, tea leaves or juice extract. In accordance with some aspects, the outer container 6 may be squeezed by the user such that the water 5 is forced from the receptacle 3 into the interior of the outer container 6, thereby assisting in bringing the water 5 in contact with the infusion bag 1.

Optionally, the outer container 6 may be agitated for a brief time by, e.g., manual shaking. Such agitation may assist in brewing the beverage.

Furthermore, as described above, outer container 6 may be vacuum sealed after receptacle 6 and infusion bag 1 are placed therein, but prior to the actual brewing operation. Accordingly, the interior of outer container 6, including infusion bag 1 and the infusible material 2 stored therein, is under vacuum pressure. Thus, when receptacle 3 is ruptured according to the procedure described above, water 5 is rapidly drawn into infusion bag 1 and absorbed by the infusible material 2, thereby expediting the brewing operation. For example, whereas prior art cold brew methods have required the infusible material to steep for many hours in order to obtain optimal flavor and consistency of the beverage, the present method, utilizing both infusible material and water under vacuum, allows for brewing in as little as, e.g., 12 to 20 minutes. Thus, not only does cold brew beverage product 7 provide for self-contained brewing, but it also allows for expedited brewing as compared to conventional cold brew methods.

In order to produce an optimally-brewed cold brew beverage, the product 7 may be allowed to incubate at low temperatures for a desired amount of time, dependent upon the user's preferences. For example, in some embodiments, the time period for incubation ranges from about 12 minutes to about 12 hours at conventional refrigerator temperatures (e.g., 32°-40° F.). However, it is to be understood that shorter or longer incubation periods and/or higher or lower incubation temperatures are possible.

After brewing and incubation are complete, an opening may be made in the outer container 6 to enable consumption of the beverage. As described above, in some embodiments, the outer container 6 is a bag that may be opened by any suitable means such as, e.g., cutting, manual tearing, and the like. In some embodiments, a user may tear the outer container bag at a notch 8 provided in the bag. Additionally and/or alternatively, while not shown, outer container 6 may be configured to include a spout or other opening formed thereon to allow for access to the brewed beverage. In accordance with some aspects, the beverage may poured into a suitable vessel for drinking, such as a cup or glass. Optionally, in accordance with other aspects, the outer container 6 may be configured such that the user may drink the beverage directly from the outer container 6 after the brewing operation is complete. For example, a spout and/or straw opening may be provided in outer container 6.

Once the brewing and incubation are complete, the beverage is ready to drink immediately. The outer container 6 (and all contents still retained therein, including the water receptacle 3 and the infusion bag 1) may be discarded without the mess or cleanup required for traditional brewing methods. The grounds and bags can be placed in a trash or recycling container.

Figure 4:
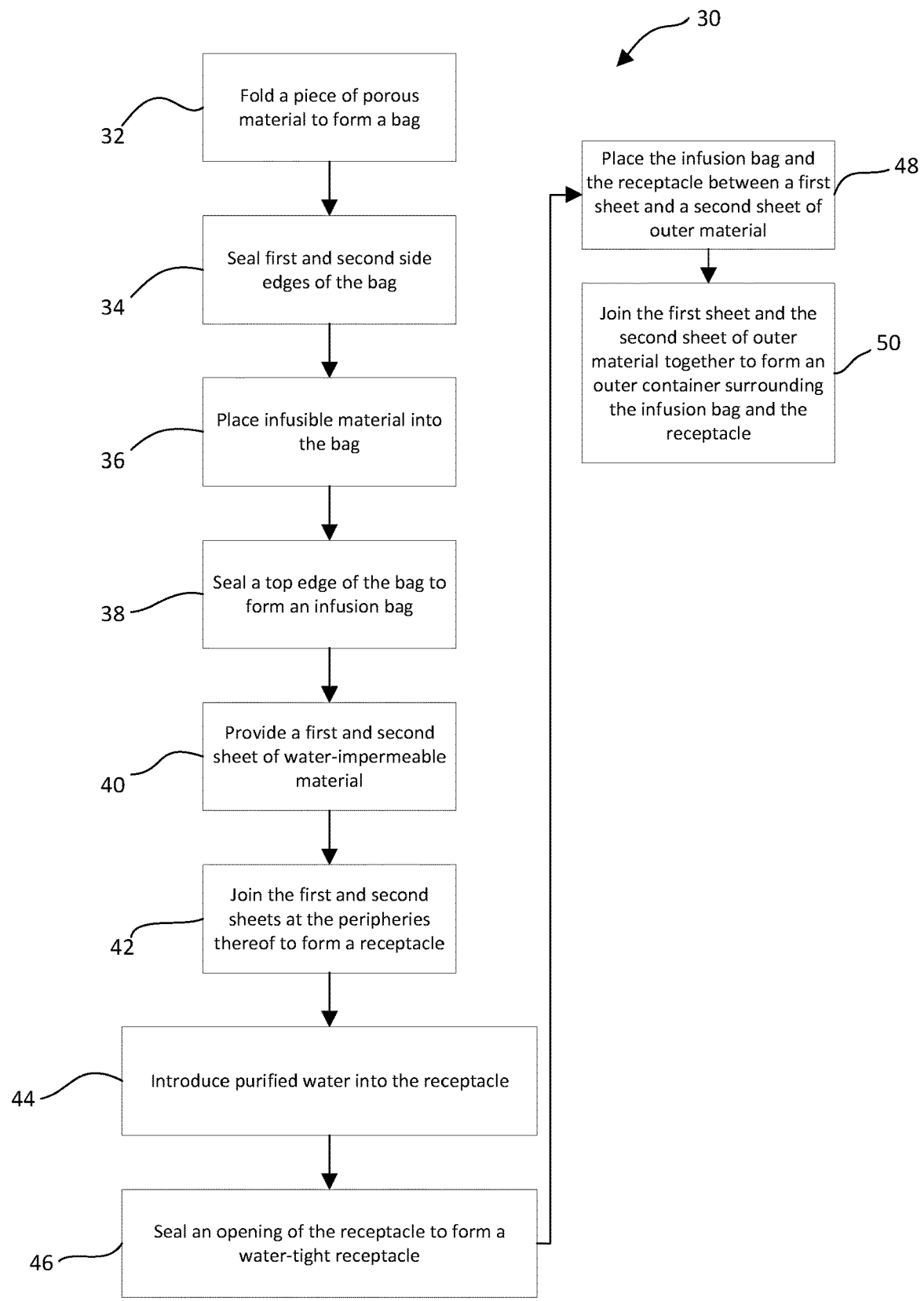
FIG. 4 is a flow chart illustrating the steps of making a cold brew beverage product in accordance with an aspect of the disclosure.

Next, referring to FIG. 4, in another aspect of the present disclosure, a method 30 is provided for making a cold brew beverage product. The method 30 may include the steps of:

a) folding a piece of porous material to form a bag (step 32), the bag comprising a first sidewall of porous material, a second sidewall of porous material overlaying the first sidewall, a first side edge, an opposite second side edge, a bottom edge extending between the first and second side edges to provide an interior volume, and a top edge;

b) sealing the first and second side edges to form the bag (step 34);

c) placing infusible material in the infusion bag (step 36);

d) sealing the top edge to form an infusion bag (step 38);

e) providing a first and second sheet of water-impermeable material (step 40);

f) joining the first and second sheets at the peripheries thereof to form a receptacle (step 42), the receptacle comprising a first sidewall of water-impermeable material, a second sidewall of water-impermeable material overlaying the first sidewall, a first side edge, an opposite second side edge, a bottom edge extending between the first and second side edges to provide an interior volume, and a top edge containing an opening;

g) introducing water into the receptacle through the opening (step 44);

h) sealing the opening to form a water-tight receptacle (step 46);

i) placing the infusion bag and the water receptacle between a first and a second sheet of an outer material having a higher rupture point than the material from which the water receptacle is formed (step 48); and j) joining the first and second sheets of the outer material at the peripheries thereof to form an outer container, wherein the infusion bag and water receptacle are disposed within the outer container (step 50).

In some embodiments, the porous material may be formed of a paper material. In some embodiments, the porous material used to form infusion bags may be sealed by any known sealing process, including, but not limited to, heat sealing.

In some embodiments, the water may be purified prior to being introduced into the receptacle. In such embodiments, the water may be purified by any suitable method. For example, the water may be purified by a reverse osmosis procedure. As purified water is substantially free from impurities, it will absorb into the infusible material more quickly than unpurified water, thereby further expediting the brewing process. Additionally, because of its improved absorption characteristics, the use of purified water may also allow for a reduction in the amount of infusible material needed to obtain a beverage having desired flavor characteristics. For example, instead of utilizing 1.7 oz. of infusible material (e.g., ground coffee) to 20 oz. of water as described above, the use of purified water may allow for a ratio of, e.g., 1.5 oz. of infusible material to 20 oz. of water. While minimal on a per-beverage basis, such potential savings in infusible material becomes drastic when large volumes of cold brew beverage products are produced in an industrialized setting.

In some embodiments, the receptacle 3 may be a water-tight bag. The bag may be formed with a first sidewall and a second sidewall of flexible plastic material. The first and second sidewalls may be overlaid and joined to each other along a first side edge, a second side edge, and a closed bottom edge extending between the first and second side edges to delineate the interior volume. To provide the opening for accessing the interior volume, the top edges of the respective first and second sidewalls, located opposite the closed bottom edge, may remain un-joined.

The water-impermeable material used to make the water receptacle 3 may be of any suitable material. In embodiments, the material may be a relatively flexible, material such as e.g., plastic, polyester, nylon, polypropylene, aluminum foil, polyethylene, etc. In some embodiments, this material may have a thickness of about 0.25 mil to about 1.5 mil.

In embodiments, air may be expelled from the receptacle 3 prior to sealing the receptacle.

In embodiments, the water-impermeable material used to make the water receptacle 3 may be sealed by any known sealing process, including, but not limited to, heat sealing.

The outer container 6 may be formed from any suitable material. In embodiments, the material is water-impermeable and has a higher rupture point than the material from which the water receptacle 3 is formed. In embodiments, the material may be a relatively flexible material such as e.g., plastic, polyester, nylon, polypropylene, aluminum foil, polyethylene, etc. In one embodiment, the material used to form the outer container 6 has a thickness of, e.g., about 3 mil.

In some embodiments, the material used to form the outer container 6 may be sealed by any known sealing process, including, but not limited to, heat sealing. Additionally, in some embodiments, the outer container 6 is vacuum-sealed.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the embodiments.

Where features or aspects of the invention are described in terms of a Markush group or other grouping of alternatives, those skilled in the art will recognized that the invention is also thereby described in terms of any individual member or subgroup of members of the Markush group or other group.

Unless indicated to the contrary, all numerical ranges described herein include all combinations and subcombinations of ranges and specific integers encompassed therein. Such ranges are also within the scope of the described invention.

What is claimed is:

1. A method for cold brewing a beverage comprising providing:
   a) an infusion bag, wherein infusible material is disposed within the infusion bag;
   b) a receptacle comprising at least one breakable wall, the receptacle having water stored therein; and
   c) an outer flexible container, wherein the infusion bag and the receptacle are each disposed within the outer flexible container;

vacuum sealing the outer flexible container after the infusion bag and the receptacle are each disposed therein;

exerting an external compression force on the outer flexible container to rupture a wall of the receptacle, wherein an opening is formed in the receptacle to allow the water to flow into the outer flexible container and through the infusion bag such that the water comes in contact with the infusible material; and incubating the outer flexible container at a temperature and for a period of time sufficient to allow the infusible material to steep in the water to produce a beverage; and maintaining a vacuum seal of the outer flexible container during the exterior step and the incubating step.

2. The method of claim 1, further comprising tearing a corner of the outer flexible container to form an opening in the outer flexible container.

3. The method of claim 1, wherein the outer flexible container is incubated at a temperature of from about 32° F. to about 40° F.

4. The method of claim 3, wherein the outer flexible container is incubated for a period of time from about 12 minutes to about 12 hours.

5. The method of claim 1, further comprising squeezing the outer flexible container such that water is forced from the receptacle into the outer flexible container and into contact with the infusion bag.

6. The method of claim 1, further comprising agitating the outer flexible container.

7. The method of claim 1, wherein by rupturing the wall of the receptacle, water is rapidly drawn into the infusion bag and absorbed by the infusible material due to the maintaining step, thereby expediting the period of time sufficient to allow the infusible material to steep in the water to produce the beverage to be about 12 minutes to about 20 minutes.

* * * * *